(12) United States Patent
Lankes et al.

(10) Patent No.: US 12,485,927 B2
(45) Date of Patent: Dec. 2, 2025

(54) AUTOMATIC RELEASING OF A CHARGING STATION FOR ELECTRIC VEHICLES

(71) Applicant: AUDI AG, Ingolstadt (DE)

(72) Inventors: Franz Lankes, Ingolstadt (DE); Jürgen Horvath, Pfakofen (DE)

(73) Assignee: AUDI AG, Ingolstadt (DE)

( * ) Notice: Subject to any disclaimer, the term of this patent is extended or adjusted under 35 U.S.C. 154(b) by 118 days.

(21) Appl. No.: 18/162,534

(22) Filed: Jan. 31, 2023

(65) Prior Publication Data

US 2023/0242156 A1    Aug. 3, 2023

(30) Foreign Application Priority Data

Feb. 1, 2022 (DE) .......................... 102022102244.7

(51) Int. Cl.
*B60L 53/36* (2019.01)
*B60L 53/16* (2019.01)
*B60L 53/66* (2019.01)
*B60W 60/00* (2020.01)
*G05B 19/4155* (2006.01)

(52) U.S. Cl.
CPC ......... *B60W 60/0025* (2020.02); *B60L 53/16* (2019.02); *B60L 53/36* (2019.02); *B60L 53/665* (2019.02); *G05B 19/4155* (2013.01); *G05B 2219/50391* (2013.01)

(58) Field of Classification Search
CPC ... B60W 60/0025; B60L 53/36; B60L 53/665; B60L 53/16; G05B 19/4155; G05B 2219/50391
See application file for complete search history.

(56) References Cited

U.S. PATENT DOCUMENTS

2018/0056803 A1* 3/2018 Hell ...................... B60L 3/0069

FOREIGN PATENT DOCUMENTS

| CN | 109760547 A | | 5/2019 | |
|---|---|---|---|---|
| CN | 112406612 A | | 2/2021 | |
| CN | 109760547 B | * | 6/2021 | |
| DE | 102010000387 A1 | | 8/2010 | |
| DE | 102015213161 A1 | | 1/2017 | |
| DE | 102017008077 A1 | | 2/2018 | |
| DE | 102016220848 A1 | | 4/2018 | |
| DE | 102016221488 A1 | | 5/2018 | |
| DE | 102020106951 A1 | | 11/2020 | |
| DE | 102019208288 A1 | | 12/2020 | |
| EP | 3628797 A1 | | 4/2020 | |
| WO | WO-2010060720 A2 | * | 6/2010 | .......... B60L 11/1816 |
| WO | WO-2012069002 A1 | * | 5/2012 | .......... B60L 53/305 |

* cited by examiner

*Primary Examiner* — Vivek D Koppikar
*Assistant Examiner* — Jeffrey R Chalhoub
(74) *Attorney, Agent, or Firm* — Seed Intellectual Property Law Group LLP

(57) ABSTRACT

A method for charging an electric vehicle is provided, which includes a charging station charging an electric vehicle connected to the charging station and situated at a charging location of the charging station. A related system for charging an electric vehicle is also provided.

8 Claims, 1 Drawing Sheet

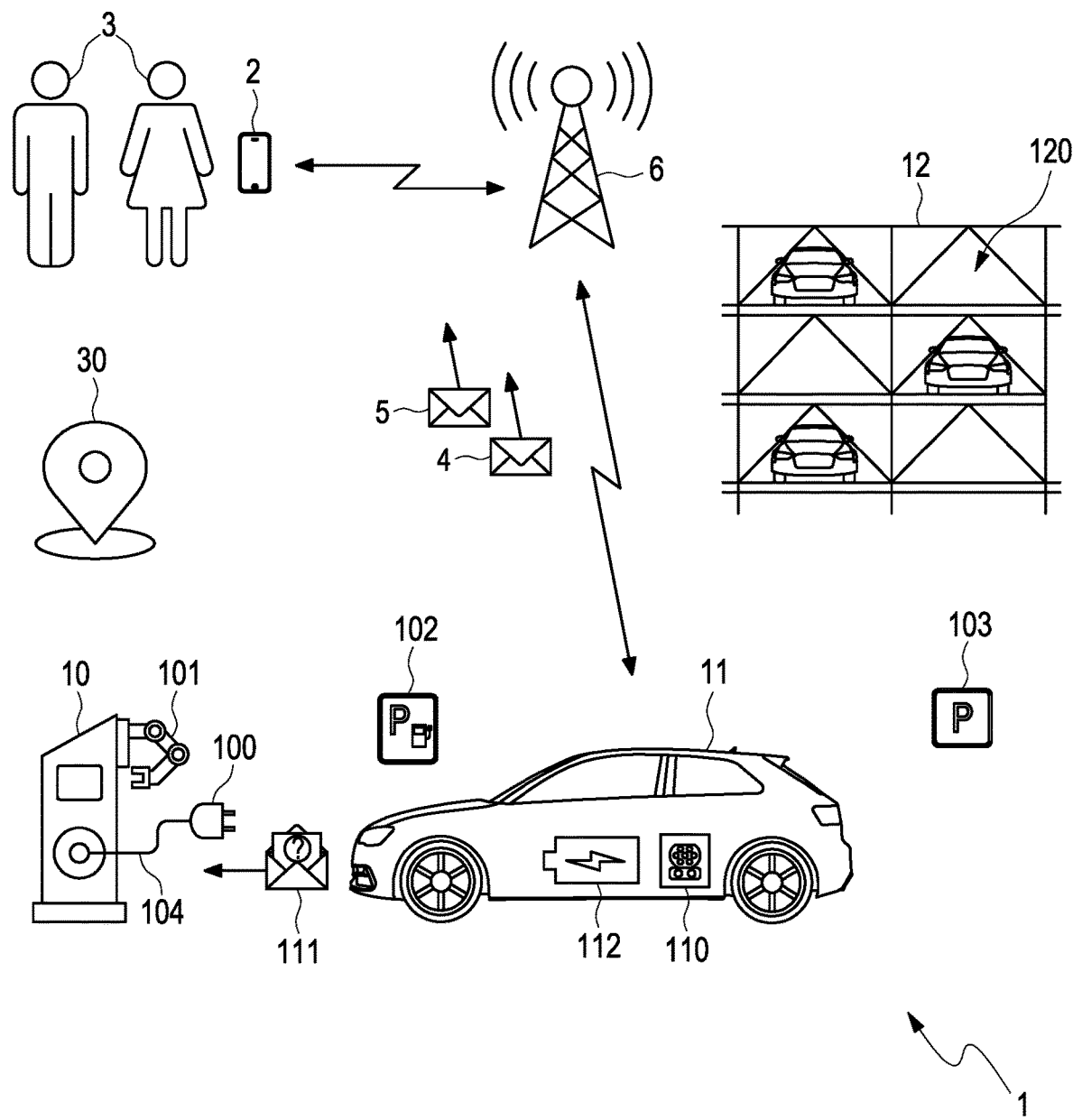

AUTOMATIC RELEASING OF A CHARGING STATION FOR ELECTRIC VEHICLES

BACKGROUND

Technical Field

Embodiments of the invention relate to a method for charging an electric vehicle, in which a charging station charges an electric vehicle connected to the charging station and situated at a charging location of the charging station. Moreover, embodiments of the invention relate to a system for charging an electric vehicle.

Description of the Related Art

Methods of the mentioned kind in various configurations are part of the prior art and serve for charging traction batteries of electric vehicles. For a charging, the user of an electric vehicle drives the electric vehicle to a charging location associated with a charging station and connects the electric vehicle to the charging station. For this, a charging plug of the charging station is usually inserted into a socket of the electric vehicle connected to a traction battery of the electric vehicle.

When the travel route of the electric vehicle is greater than the remaining range of the electric vehicle, a charging of the electric vehicle on the way is required. However, the electric vehicle needs an unoccupied charging station for this.

Thus, WO 2012/069 002 A1 discloses a method for charging an electric vehicle in which a mobile terminal device of a user of an electric vehicle sends in advance a charging request regarding a charging station of a charging system to a server of the charging system, the server receives the charging request and reserves the particular charging station, if available, for a particular period of time, and the reserved charging station charges the electric vehicle during the period of time so determined when it is connected to the reserved charging station.

In order to make use of the period of time needed for the charging, for example for shops or services in the vicinity of the charging station, the user must know the length of the period of time or be aware of the remaining period of time to the end of the charging.

This is the purpose served by the method disclosed in DE 10 2010 000 387 A1 for charging an electric vehicle, wherein a mobile terminal device of a user of an electric vehicle receives a series of messages from a charging station regarding the estimated and the actual time for the end of the charging of the electric vehicle.

CN 112406612 A also discloses such a method for the charging of an electric vehicle, wherein a charging station sends a message regarding the end of the charging of an electric vehicle to a mobile terminal device of a user of the electric vehicle, the mobile terminal device receives the message and assesses a blocking fee if the user does not disconnect the electric vehicle in good time from the charging station.

However, the user may be hindered in releasing the charging station in good time by disconnecting the electric vehicle from the charging station.

BRIEF SUMMARY

Some embodiments include a method for charging an electric vehicle which reliably avoids a blocking fee assessed by a charging station after a charging of the electric vehicle.

Some embodiments include a method for charging an electric vehicle, in which a charging station charges an electric vehicle connected to the charging station and situated at a charging location of the charging station. The charging station transfers electric energy to a traction battery of the electric vehicle by means of a charging cable, which connects the electric vehicle to the charging station. The length of the charging cable defines an environment of the charging station, in which one or more charging locations are arranged and coordinated with the charging station.

The electric vehicle connected to the charging station blocks at least the charging cable and thereby prevents another electric vehicle from being charged by means of the charging cable. If the electric vehicle is still blocking the charging cable after the end of the charging, the charging station can assess a blocking fee.

In some embodiments, the electric vehicle after the charging sends a disconnect request to the charging station, the charging station receives the disconnect request that was sent and a charging robot of the charging station disconnects a charging plug of the charging station from a charging socket of the electric vehicle pursuant to the disconnect request received. The electric vehicle orders the charging station to automatically disconnect the connection when the charging is ended. For this, the charging robot removes the charging plug connected by means of the charging cable to the charging station from the charging socket of the electric vehicle. In this way, the electric vehicle releases the charging cable of the charging station.

In this way, an availability of the charging cable for the charging of another electric vehicle is assured after the charging of the electric vehicle. The additional electric vehicle can be situated at another charging location of the charging station and be charged by means of the charging cable. As a result, the charging station does not assess any blocking fee.

The electric vehicle may autonomously leave the charging location after the disconnecting. If the electric vehicle has an autonomous form of driving, it moves away from the charging location and frees up the charging location. In this way, the electric vehicle frees up the charging location of the charging station, i.e., after the charging of the electric vehicle the availability of the charging location for the charging of another electric vehicle is assured. The additional electric vehicle can be situated at the charging location and be charged by means of the available charging cable. As a result, the charging station does not assess any blocking fee in the event that the charging station does not have any other charging location or another charging location of the charging station is not free, i.e., it is occupied by another electric vehicle.

Advisedly, a mobile terminal device of a user of the mobile terminal device determines the behavior of the electric vehicle after leaving the charging location. The mobile terminal device can be configured in known manner as a smartphone, a tablet, a notebook or the like. The user controls the electric vehicle by means of the mobile terminal device, or rather by means of an application (App) running on the mobile terminal device. If the user is situated at a distance from the electric vehicle, the mobile terminal device and the electric vehicle are connected for example through a mobile radio network.

Alternatively, the behavior can be determined by means of the electric vehicle itself. In this case, the user controls the electric vehicle for example by means of an infotainment system of the electric vehicle. It should be noted that by control is meant here a previous setting of a corresponding configuration of the electric vehicle, i.e., not remote control in real time.

In one embodiment, the behavior so determined is that the electric vehicle autonomously drives to a location determined by the user of the electric vehicle by means of the mobile terminal device. The determination involves a defining of the location in known manner, for example, an entering of the position of the location as an address or as geographical coordinates. If the user is at a distance from the electric vehicle at the end of the charging, the location may be determined as a location of the user, especially the mobile terminal device. This configuration is usually known as a "drive by" of the electric vehicle, i.e., the electric vehicle drives to the location of the user and picks up the user at the location.

In another embodiment, the behavior so determined is that the electric vehicle autonomously drives to an automatic parking system determined by the charging station or the user of the electric vehicle by means of the mobile terminal device and to a parking space of the automatic parking system as determined by the automatic parking system. The automatic parking system can comprise a parking structure, an open parking area, and/or an underground garage and be configured to steer the autonomously driving electric vehicle to a particular free parking space of the parking structure, the open parking area, and/or the underground garage. The electric vehicle parks in the assigned parking space. The automatic parking system can assess a parking fee for the parking, in familiar manner, which will be lower in particular than the blocking fee.

In one special configuration, the automatic parking system can be coordinated with the charging station or the charging station may be included in the automatic parking system. In other words, the charging station is situated near the automatic parking system or in the parking structure, at the open parking area, and/or in the underground garage of the automatic parking system.

In yet another embodiment, the behavior so determined is that the electric vehicle autonomously drives to a pickup location assigned to the charging station, the electric vehicle or the charging station sends a message regarding the readiness for pickup of the electric vehicle to the mobile terminal device, and the mobile terminal device receives the message so sent. The pickup location may be situated outside an environment of the charging station as defined by the length of a charging cable. Consequently, the charging station is not blocked by the charged electric vehicle, ready to be picked up and waiting for the user. The charging station can assess a fee for failure to pick up if the electric vehicle does not leave the pickup location within a given pickup period, which in particular will be lower than the blocking fee.

The electric vehicle after a predetermined pickup period can drive autonomously from the pickup location to an automatic parking system as determined by the charging station, if the user of the electric vehicle does not remove the electric vehicle from the pickup location within the pickup period. This behavior of the electric vehicle will avoid the fee otherwise charged for failure to pick up the vehicle.

The electric vehicle or the charging station may send a message regarding the end of the charging to the mobile terminal device and the mobile terminal device receives the message so sent. The user is informed by the message so received as to the availability of the electric vehicle. Apart from this, the user can determine the behavior of the electric vehicle in good time, pursuant to the message received, by means of the mobile terminal device, or change a behavior already determined for the electric vehicle.

The mobile terminal device can also determine a degree of charging of the electric vehicle, a quantity of charge of the electric vehicle, a range of the electric vehicle, a charging time span, and/or a price for the charging. In summary, the extent of the charging can be defined by means of the mobile terminal device. For example, it can be configured such that the electric vehicle is charged fully or with a given quantity of energy, sufficient for a given range or within a given span of time. Likewise, it can be set so that a maximum price for the charging is not exceeded. Thanks to the configuration, the electric vehicle recognizes the end of the charging and after recognizing the end it transmits the disconnect request to the charging station.

Some embodiments include a system for charging an electric vehicle, comprising an electric vehicle and a charging station. Such systems are widespread, so that many diverse fields of application exist for the embodiments described herein. In particular, the charging station belongs to a charging infrastructure encompassing a plurality of charging stations and a central charging server, which is configured to control the operation of the charging stations.

In some embodiments, the charging station comprises a charging robot and the system is configured to carry out a method as described herein. The charging robot allows an automatic disconnecting of the electric vehicle from the charging station and thus a releasing of the charging station, thereby preventing a blocking fee assessed by the charging station. In this way, it becomes possible for the user of the electric vehicle to run errands or go shopping during the time span of charging of the electric vehicle. The errands or shopping could last longer than the time span of the charging, without incurring the blocking fee.

A major benefit of the method described herein is that a blocking fee of a charging station is avoided and the user of an electric vehicle has flexibility in using a time span of charging of the electric vehicle to run errands or go shopping.

BRIEF DESCRIPTION OF THE SEVERAL VIEWS OF THE DRAWINGS

Embodiments are shown schematically with the aid of the drawings and shall be further described with reference to the drawings.

FIG. 1 is a block diagram of a system for charging an electric vehicle.

DETAILED DESCRIPTION

FIG. 1 shows a block diagram of a system 1 according to one embodiment for charging an electric vehicle 11. The system 1 comprises an electric vehicle 11 having a traction battery 112 and a charging station 10 having a charging robot 101. Moreover, the system 1 can comprise an automatic parking system 12. The system 1 is configured to carry out a method described below for charging the electric vehicle 11.

The charging station 10 charges the electric vehicle 11 connected to the charging station 10 and situated at a charging location 102 of the charging station 10. The electric vehicle 11 after the charging sends a disconnect request 111 to the charging station 10, for example by means of a charging cable 104 of the charging station 10.

The charging station 10 receives the disconnect request 111 that was sent. A charging robot 101 of the charging station 10 disconnects a charging plug 100 of the charging station 10 from a charging socket 110 of the electric vehicle 11 pursuant to the disconnect request 111 received.

The electric vehicle 11 autonomously leaves the charging location 102 after the disconnecting.

A mobile terminal device 2 such as a smartphone of a user 3 of the electric vehicle 11 can determine the behavior of the electric vehicle 11 after leaving the charging location 102. The mobile terminal device 2 can for example determine the behavior through a wireless connection to the electric vehicle 11 provided by a mobile radio network 6.

The behavior so determined may be that the electric vehicle 11 autonomously drives to a location 30 determined by the user 3 of the electric vehicle 11 by means of the mobile terminal device 2.

Alternatively, the behavior so determined can be that the electric vehicle 11 autonomously drives to an automatic parking system 12 determined by the charging station 10 or the user 3 of the electric vehicle 11 by means of the mobile terminal device 2 and to a parking space 120 of the automatic parking system 12 as determined by the automatic parking system 12.

Furthermore alternatively the behavior so determined can be that the electric vehicle 11 autonomously drives to a pickup location 103 assigned to the charging station 10, the electric vehicle 11 or the charging station 10 sends a message 4 regarding the readiness for pickup of the electric vehicle 11 to the mobile terminal device 2, and the mobile terminal device receives the message 4 so sent.

The electric vehicle 11 after a predetermined pickup period may drive autonomously from the pickup location 103 to an automatic parking system 12 as determined by the charging station 10, if the user 3 of the electric vehicle 11 does not remove the electric vehicle 11 from the pickup location 103 within the pickup period.

Advisedly, the electric vehicle 11 or the charging station 10 sends a message 5 regarding the end of the charging to the mobile terminal device 2 and the mobile terminal device 2 receives the message 5 so sent.

The mobile terminal device 2 may determine a degree of charging of the electric vehicle 11, a quantity of charge of the electric vehicle 11, a range of the electric vehicle 11, a charging time span, and/or a price for the charging.

German patent application no. 10 2022 102244.7, filed Feb. 1, 2022, to which this application claims priority, is hereby incorporated herein by reference in its entirety. Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for charging electric vehicles, comprising:
by a charging station, charging a first electric vehicle connected to the charging station and situated at a charging location of the charging station;
by the first electric vehicle after the charging, sending a disconnect request to the charging station by way of a charging cable of the charging station;
by the charging station, receiving the disconnect request that was sent from the first electric vehicle by way of the charging cable of the charging station;
by a charging robot of the charging station, disconnecting a charging plug of the charging station from a charging socket of the first electric vehicle pursuant to the disconnect request received;
by the first electric vehicle, autonomously driving the first electric vehicle to a pickup location after the disconnecting, wherein the pickup location is outside an environment of the charging station;
by the first electric vehicle, autonomously driving the first electric vehicle from the pickup location to a parking space in response to determining that the first electric vehicle has been in the pickup location for at least a predetermined pickup period, wherein the parking space is different from the pickup location;
assessing, by the charging station, a first blocking fee in response to determining that a second electric vehicle is blocking the charging cable; and
assessing, by the charging station, a second blocking fee that is lower than the first blocking fee in response to determining that a third electric vehicle has been in the pickup location for at least the predetermined pickup period.

2. The method according to claim 1, in which a mobile terminal device of a user of the first electric vehicle determines a behavior of the first electric vehicle after leaving the charging location.

3. The method according to claim 2, in which the behavior so determined is that the first electric vehicle autonomously drives to a location determined by the user of the first electric vehicle by way of the mobile terminal device.

4. The method according to claim 2, wherein the parking space is part of an automatic parking system that is determined by the charging station or the user of the first electric vehicle by way of the mobile terminal device and the parking space of the automatic parking system is determined by the automatic parking system.

5. The method according to claim 2, wherein the first electric vehicle or the charging station sends a message regarding readiness for pickup of the first electric vehicle at the pickup location to the mobile terminal device, and the mobile terminal device receives the message so sent.

6. The method according to claim 2, in which the first electric vehicle or the charging station sends a message regarding an end of the charging to the mobile terminal device and the mobile terminal device receives the message so sent.

7. The method according to claim 2, in which the mobile terminal device determines a degree of charging of the first electric vehicle, a quantity of charge of the first electric vehicle, a range of the first electric vehicle, a charging time span, and/or a price for the charging.

8. A system for charging electric vehicles, comprising:
an electric vehicle; and
a charging station having a charging robot,
wherein the system, in operation, performs a method for charging a first electric vehicle, comprising:
by the charging station, charging the first electric vehicle when the first electric vehicle is connected to the charging station and situated at a charging location of the charging station,
by the first electric vehicle after the charging, sending a disconnect request to the charging station by way of a charging cable of the charging station,
by the charging station, receiving the disconnect request sent from the first electric vehicle by way of the charging cable of the charging station, and by the charging robot in response to the receiving of the disconnect request, disconnecting a charging plug of the charging station from a charging socket of the first electric vehicle, by the first electric vehicle, autonomously driving the first electric vehicle to a pickup location after the disconnecting, wherein the pickup location is outside an environment of the charging station, by the first electric vehicle, autonomously driving the first electric vehicle from the pickup location to a parking space in response to determining that the first electric vehicle has been in the pickup location for at least a predetermined pickup period, wherein the parking space is different from the pickup location assessing, by the charging station, a first blocking fee in response to determining that a second electric vehicle is blocking the charging cable, and assessing, by the charging station, a second blocking fee that is lower than the first blocking fee in response to determining that a third electric vehicle has been in the pickup location for at least the predetermined pickup period.

* * * * *